United States Patent [19]

Wood

[11] Patent Number: 4,731,827
[45] Date of Patent: Mar. 15, 1988

[54] INTERSWITCH LINE CIRCUIT

[75] Inventor: Samuel F. Wood, Los Altos Hills, Calif.

[73] Assignee: David Systems, Inc., Sunnyvale, Calif.

[21] Appl. No.: 665,681

[22] Filed: Oct. 29, 1984

[51] Int. Cl.$^4$ .................................... H04M 3/22
[52] U.S. Cl. ................................ 379/377; 307/236; 328/118; 379/382
[58] Field of Search ........ 179/18 FA, 18 HB, 18 AB, 179/18 AH, 18 AD, 84 R, 84 A, 86, 99 LC, 94 R, 16 AA, 16 A, 81 R; 307/236, 355, 356; 328/115, 118, 1; 379/372, 377, 379, 373, 382, 418, 112, 378, 162, 385

[56] References Cited

U.S. PATENT DOCUMENTS

| | | | |
|---|---|---|---|
| 3,408,581 | 10/1968 | Wakamoto et al. | 328/118 X |
| 3,622,895 | 11/1971 | Starkey et al. | 307/236 X |
| 4,092,489 | 5/1978 | Birlmeier | 328/118 X |
| 4,278,938 | 7/1981 | Morriss | 324/117 R |
| 4,323,734 | 4/1982 | Kimzey | 379/162 |
| 4,326,104 | 4/1982 | Bergida | 379/379 A |
| 4,360,709 | 11/1982 | Hamazato et al. | 379/385 |
| 4,361,732 | 11/1982 | Woods | 379/398 |
| 4,446,338 | 5/1984 | Rosch | 379/385 |
| 4,454,477 | 6/1984 | Joffe | 328/149 |
| 4,495,494 | 1/1985 | McCune | 340/825.06 |
| 4,524,246 | 6/1985 | Meza | 379/377 |
| 4,540,853 | 9/1985 | Albouy | 379/378 |
| 4,570,034 | 2/1986 | Serrano | 379/373 X |
| 4,580,011 | 4/1986 | Glaser | 379/112 |

Primary Examiner—Jin F. Ng
Assistant Examiner—R. Vaas
Attorney, Agent, or Firm—Townsend & Townsend

[57] ABSTRACT

A tip-ring interface that utilizes a single detector to detect ringing, forward loop current, and reverse loop current. In one embodiment, forward or reverse battery state may be detected when on-hook.

8 Claims, 11 Drawing Figures

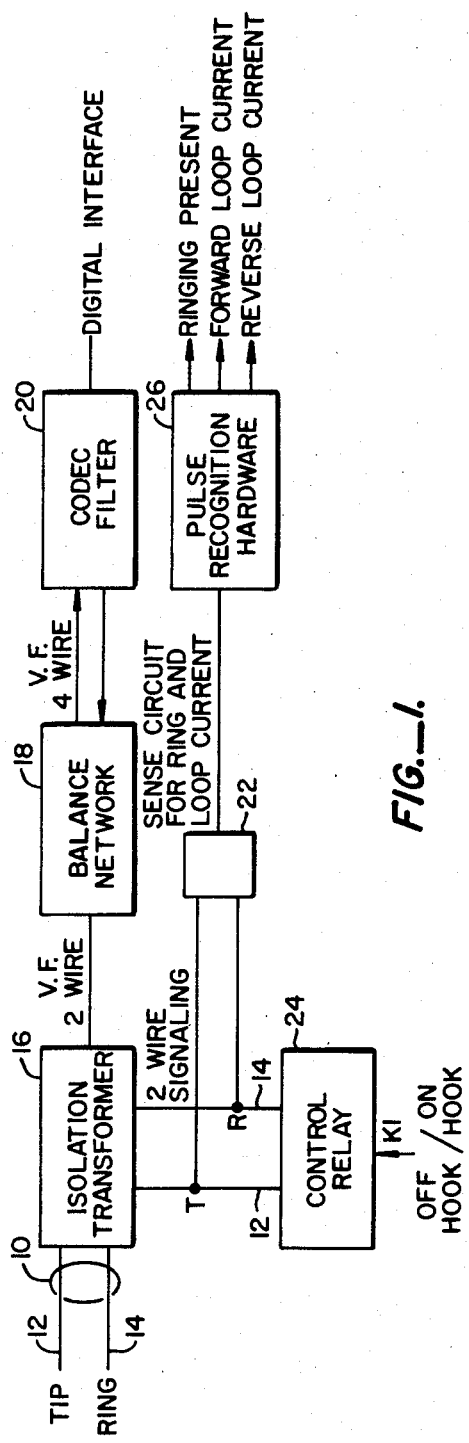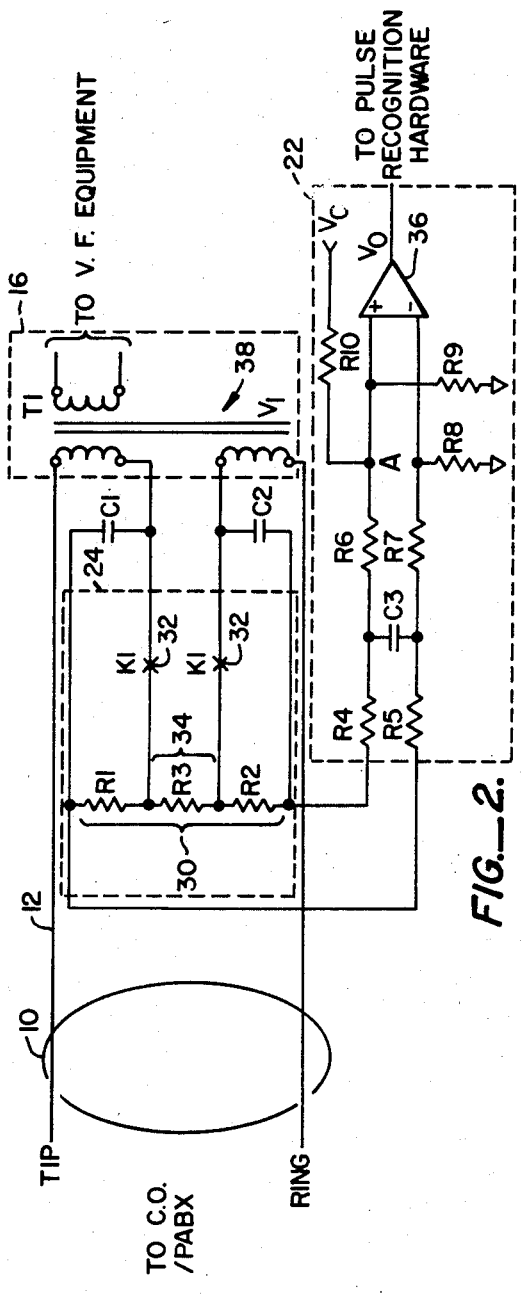

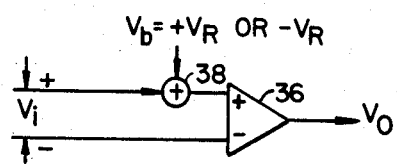
FIG._3A.
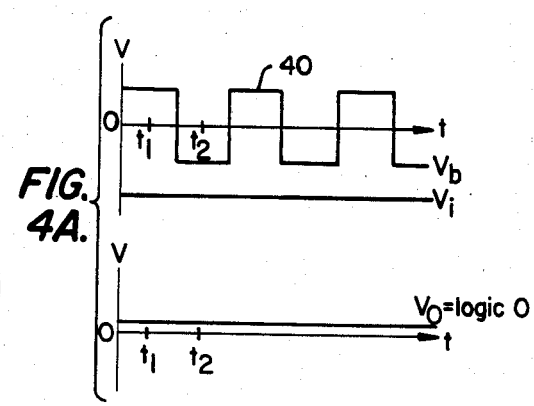
FIG. 4A.
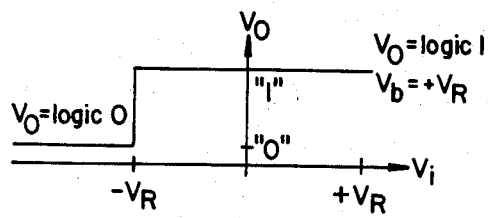
FIG._3B.
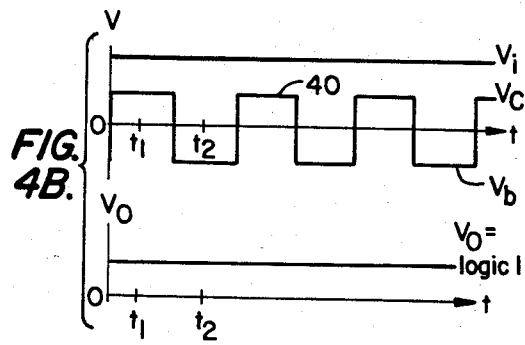
FIG. 4B.
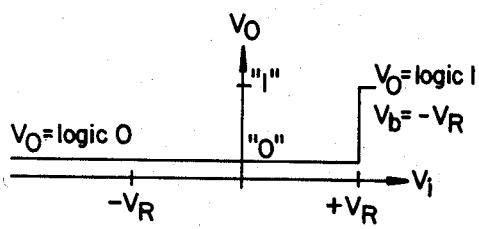
FIG._3C.
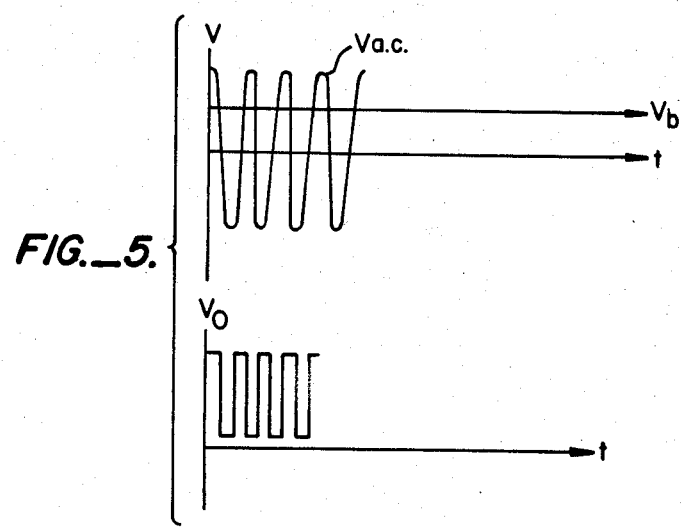
FIG._5.

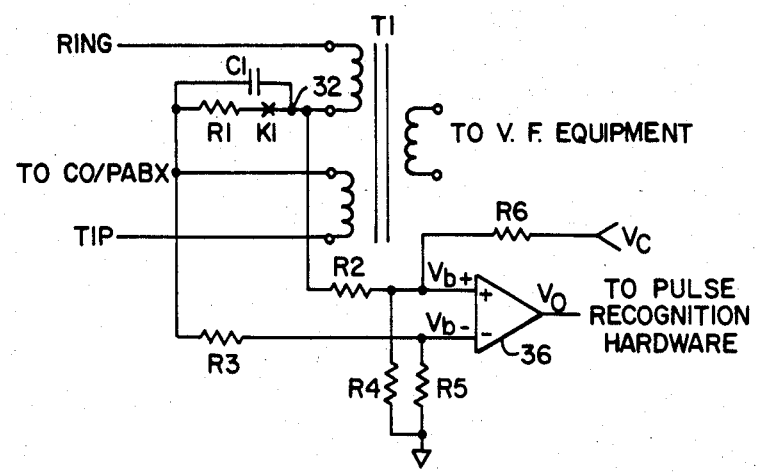
FIG._6.
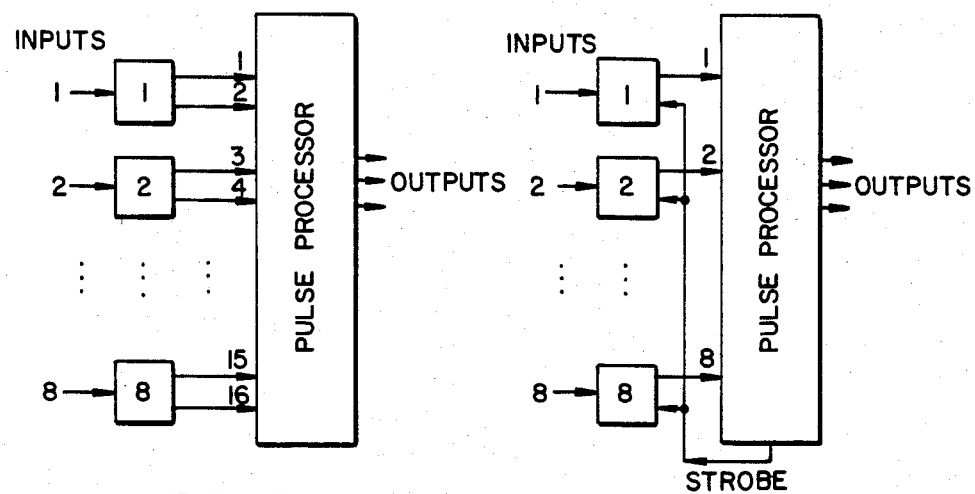
FIG._7A.   FIG._7B.

INTERSWITCH LINE CIRCUIT

BACKGROUND OF THE INVENTION

1. Field of the Invention

This invention relates generally to interface circuits for use in telephone systems and more particularly to a trunk interface circuit between a PABX or cental office (C.O.) line circuit and a telephone set.

2. Description of the Prior Art

Each telephone set is connected to a central office that contains switching equipment, signaling equipment, and batteries that supply direct current to operate the telephone set and is connected to the central office through a trunk comprising two wires, termed a local loop, or alternatively to a PABX interconnected with the central office. One of these wires in the wire pair is designated T (for "tip") and the other is designated R (for "ring"). The tip-ring interface is located between the telephone set and the terminus of the local loop. This interface contains signaling circuitry—for going off-hook, for dialing, and for receiving incoming ringing and forward and reverse loop current; transmission circuitry—for the transmission and reception of audio signals, i.e., the circuits that carry our voices; and isolation circuitry—for electrically isolating the telephone set from the central office. The interface must include detecting circuitry for detecting ringing and the presence of current in the loop in either the forward or reverse direction.

Previous interface circuits used separate detectors for ringing signal detection, forward loop current detection, and reverse loop current detection. The interface curcuits reflect per line expenses and, thus, any increase in the costs of an interface is multiplied by the number of lines utlized by a customer. The cost of these extra detectors and associated circuitry thus becomes a significant cost to the customer. Additionally, a system utilizing two detectors to sense loop directions presents two output signals which must be processed thereby further increasing the cost per line of prior art systems.

SUMMARY OF THE INVENTION

In the present invention a single detector is utilized to detect the presence of ringing, forward loop current, and reverse loop current. The ability to detect these varying trunk states is accomplished by utilizing the techniques of relay switching and bias control.

Detection is accomplished through the use of a comparator which compares input signal, $V_i$, with a reference bias voltage $V_b$ having magnitude equal to $+V_R$ or $-V_R$. The comparator produces an output voltage representative of logic 1 if the algebraic sum of $V_i$ and $V_b$ is greater than zero volts, and of logic 0 if the aforementioned sum is less than zero volts.

In one embodiment of the present system, detection of forward and reverse loop current by a single detector is accomplished as follows. The input voltage signal is developed across a D.C. resistive network through which the loop current flows. The polarity of the input voltage signal will thus be determined by the direction of current flow. The bias voltage to the comparator is provided by a separate voltage source, $V_c$. The input voltage and the bias voltage are provided to the comparator through a resistive voltage dividing network. For loop current detection, the bias voltage is switched between plus and minus $V_R$. The D.C. resistive network and the voltage dividing resistive network are designed so that the D.C. voltage input state generated across the D.C. resistive network is of greater magnitude than the absolute value of the reference voltage, $V_R$. By sampling the comparator output signal at each bias point, output samples referenced to two different thresholds are obtained. By comparing the polarity of the comparator output signal, $V_O$ (representing logic 0 or 1), with the polarity of the reference voltage, $V_b$, the input voltage state is determined, thus, in turn, determining the direction of loop current flow.

In an alternative embodiment, the battery state of the local loop may be determined when virtually no loop current is flowing.

A ringing signal is detected by the same detector utilized for detecting forward and reverse loop current or battery state as follows. Ringing is a 20 Hz. A.C. voltage applied across the tip and ring in the on-hook state. The voltage is capacitively coupled to an A.C. resistive network configured to generate an A.C. input voltage state. The A.C. resistive network and the resistive voltage dividing network are designed so that the input voltage state for the A.C. ringing signal has a peak magnitude greater than the bias voltage state applied to the comparator. When the telephone is in the on-idle state the comparator bias voltage, $V_R$, is positive. The negative peaks of the incoming A.C. ringing signal will overcome the bias, $V_R$, and will appear at the comparator output, $V_O$, as a series of logic 0. These pulses will be detected when $V_O$ is sampled and referenced to the bias voltage.

The D.C. resistive network is coupled to the tip and ring lines by relay contacts activated by the on-hook/off-hook input signal from the telephone set. In the on-hook position the relay is open and in the off-hook condition the relay is closed. In a first embodiment, both terminals of the D.C. resistive network are disconnected from the tip-ring circuit when the telephone set is in the on-hook condition. Accordingly, no loop current flows in the on-hook condition and the tip and ring circuit is isolated from the comparator.

In a second embodiment, only one terminal of the D.C. resistive network is disconnected when the telephone set is in the on-hook condition. Accordingly, the polarity state of the battery will appear across the resistive voltage dividing network even when the telephone set is on the on-hook condition. Thus, the battery state may be detected by the comparator when the telephone set is in the on-hook condition. The resistance of the resistive voltage dividing network is selected so that virtually no loop current flows when the telephone set is in the on-hook condition.

BRIEF DESCRIPTION OF THE DRAWINGS

FIG. 1 is a block diagram of the present invention.

FIG. 2 is a circuit diagram of an embodiment utilizing two relays.

FIG. 3A is a schematic diagram of an op amp comparator.

FIGS. 3B and 3C are graphs depicting the output of the op amp comparator as a function of its inputs.

FIGS. 4A and 4B are graphs depicting the inputs and outputs of the op amp comparator in a loop current detection mode.

FIG. 5 is a set of graphs depicting the inputs and outputs of the op amp comparator in a ringing signal detection mode.

FIG. 6 is a circuit diagram depicting an embodiment using one relay contact.

FIG. 7A is a schematic diagram depicting a typical circuit pack configuration for detecting signalling.

FIG. 7B depicts a circuit pack configuration utilizing the principles of the present invention.

DETAILED DESCRIPTION OF THE PREFERRED EMBODIMENTS

The present invention is an interface circuit connecting a PABX or C.O. line circuit and a telephone set. It is to be understood that the term telephone set as used herein describes any machine providing a voice linkage with a user and includes traditional telephone sets, electronic telephone sets, and microprocessor or computer controlled telephone sets.

Referring now to FIG. 1, a block diagram of a system including an interface circuit between a PABX or C.O. line circuit and a telephone set is depicted. In FIG. 1, a C.O. or PABX line circuit 10 includes tip and ring lines 12 and 14, respectively. The following discussion will relate to an interface between a central office line circuit and a telepone set to simplify the following description of the invention. However, if it is to be understood that the interface may be utilized with a PABX or any other system that provides signaling in a similar manner to a central office. The C.O. line circuit 10 connects each telephone set to a central office that contains switching equipment, signaling equipment, and batteries that supply direct current to operate the telephone set. An isolation transformer 16 provides isolation from common mode signals on the local loop. The balance network and codec filter 18 and 20 are standard elements of an electronic telephone set and will not be described herein. The tip and ring lines 12 and 14 are interconnected to a detector 22 for sensing a ringing signal, forward loop current, and reverse loop current. The interconnection of the tip and ring lines 12 and 14 with the sensor 22 is controlled by a relay 24. An input off-hook/on-hook signal determines whether the control relay 24 is open or closed where the relay is open when the telephone set is on-hook and closed when the telephone set is off-hook.

In a standard telephone set off-hook indicates that the receiver has been removed from its cradle and that the user desires to connect with an outside line while on-hook designates the state where the receiver is placed in its cradle. In a general sense, the telephone set is in an off-hook condition whenever the user desires to utilize the telephone and this condition may be initiated in various ways.

The output from the detector 22 is routed to a pulse recognition circuit which analyzes the detector output signal to determine whether a ringing signal, forward loop current, or reverse loop current is present in the C.O. line circuit 10.

In the present invention the detector 22 includes a single operational amplifier with a bias control circuit and a relay controlled resistive/capacitive network to allow for the sensing of ringing, forward loop current, or reverse loop current utilizing the single operational amplifier.

FIG. 2 is a circuit diagram depicting preferred embodiment of the present invention. In FIG. 2 the C.O. trunk line circuit 10 is capacitively coupled, via capacitor $C_1$ and $C_2$ to the terminals of a A.C. resistive network 30, comprising resistors R1, R2, and R3, when relay contacts K1 32 are open and is directly coupled to the terminals of a D.C. resistive network 34, comprising resistor R3, when relay contacts K1 32 are closed. The terminals of the A.C. resistive network 30 are connected to the inputs of an operational amplifier 36, configured as a comparator circuit, by an A.C. resistive voltage dividing network comprising R4, R6, R9 tied to ground and R5, R7, R8 tied to ground and capacitor $C_3$ which provides transient protection when an A.C. ringing signal is present on the C.O. trunk line. Similarly, the terminals of the D.C. resistive network 34 are interconnected with the comparator 36 by a D.C. voltage dividing network comprising R1, R5, R7, R8 connected to ground, R2, R4, R6, and R9 connected to ground, and the capacitor $C_3$. The bias voltage is inthat the user desires to connect with an outside line while on-hook designates the state where the receiver is placed in its cradle. In a general sense, the telephone set is in an off-hook condition whenever the user desires to utilize the telephone and this condition may be initiated in various ways.

The output from the detector 22 is routed to a pulse recognition circuit which analyzes the detector output signal to determine whether a ringing signal, forward loop current, or reverse loop current is present in the C.O. line circuit 10.

In the present invention the detector 22 includes a single operational amplifier with a bias control circuit and a relay controlled resistive/capacitive network to allow for the sensing of ringing, forward loop current, or reverse loop current utilizing the single operational amplifier.

FIG. 2 is a circuit diagram depicting a preferred embodiment of the present invention. In FIG. 2 the C.O. trunk line circuit 10 is capacitively coupled, via capacitor $C_1$ and $C_2$ to the terminals of a A.C. resistive network 30, comprising resistors R1, R2, and R3, when relay contacts K1 32 are open and is directly coupled to the terminals of a D.C. resistive network 34, comprising resistor R3, when relay contacts K1 32 are closed. The terminals of the A.C. resistive network 30 are connected to the inputs of an operational amplifier 36, configured as a comparator circuit, by an A.C. resistive voltage dividing network comprising R4, R6, R9 tied to ground and R5, R7, R8 tied to ground and capacitor $C_3$ which provides transient protection when an A.C. ringing signal is present on the C.O. trunk line. Similarly, the terminals of the D.C. resistive network 34 are interconnected with the comparator 36 by a D.C. voltage dividing network comprising R1, R5, R7, R8 connected to ground, R2, R4, R6, and R9 connected to ground, and the capacitor $C_3$. The bias voltage is introduced through $V_C$ and the resistor R10. The tip and ring lines 12 and 14 respectively are interconnected with the windings of the isolation transformer T1 38.

The following is a table of representative resistance and capacitance values and model identifications for the circuit elements depicted in FIG. 2:

$R_1 = 1 \text{ k}\Omega$
$R_2 = 1 \text{ k}\Omega$
$R_3 = 200 \ \Omega$
$R_4 = 100 \text{ k}\Omega$
$R_5 = 100 \text{ k}\Omega$
$R_6 = 402 \text{ k}\Omega$
$R_7 = 402 \text{ k}\Omega$
$R_8 = 201 \text{ k}\Omega$
$R_9 = 20.5 \text{ k}\Omega$
$R_{10} = 887 \text{ k}\Omega$
$C_1 = 1 \ \mu f$ $C_2 = 1 \mu f$ $C_3 = 0.047 \mu f$ Op amp = Model MC 1458

To better understand the invention, a brief description of the operation of a comparator is included with reference to FIGS. 3A, 3B, and 3C. In FIG. 3A, $V_i$ represents the voltage deveoped across either the A.C. or D.C. resistive network 30 or 34. The point A in the circuit depicted in FIG. 2 is represented, logically, by an adder 38. The bias voltage, $V_b$, and the input voltage, $V_i$, are algebraically summed at the adder 37 and this summed voltage is applied to the inputs of the comparator 36. $V_O$ indicates the output signal of the operational amp responsive to a given bias voltage and input voltage. The comparator produces an output voltage representative of logic 1 if the algebraic sum of $V_i$ and $V_b$ is greater than zero volts, and of logic 0 if the aforementioned sum is less than zero volts. It is to be understood that the invention does not depend on any particular configuration of the comparator circuit and that the description which follows is merely intended to facilitate the understanding of the invention and places no limitation on the various comparator circuits which could be utilized to implement the voltage detection function of the present invention.

Referring now to FIG. 3B, a graph of the output signal $V_O$ as a function the input voltage, $V_i$, and the bias voltage, $V_b$, when the bias voltage is equal to $+V_R$ is depicted. Note that for a positive input voltage the output signal from the comparator $V_O$ is representative of a logic 1. However, when the input voltage, $V_i$, exceeds the magnitude of $V_R$ and is of opposite polarity than the bias voltage, the output signal swings to a value representative of logic 0. Thus an output signal of opposite polarity and greater magnitude than $V_b$ can be detected by comparing the logic state of $V_O$ with the polarity of the reference voltage. Similarly, FIG. 3C depicts the output voltage of the comparator when $V_b$ is equal to $-V_R$. Note that for a negative input voltage the output signal $V_O$ is reprsentative of logic 0. However, when $V_i$ is of opposite polarity from $V_b$ and exceeds the magnitude of $V_R$, the output signal, $V_O$, becomes a logic 1. Thus, when the bias voltage is equal to negative $V_R$, an input signal of opposite polarity and greater than the magnitude of $V_b$ may be detected.

In FIGS. 4A and 4B the technique for utilizing a single operational amplifier comparator circuit to detect both forward and reverse loop current is described. Referring to FIG. 4A, the bias voltage is introduced to the op amp 36 through R10 and $V_C$. This bias voltage sets the trigger voltage of the op amp comparator circuit as described above with reference to FIGS. 3A through 3C. The bias voltage $V_C$ is switched between $+5$ and $-5$ volts as depicted in the graph. This causes an offset to switch between $+0.012$ and $-0.012$ volts on the comparator input terminals. Thus, the bias voltage at the input terminals is in the form of a square wave 40 of a predetermined period as depicted in FIG. 4A.

Turning now to the detection of forward loop current, the relay contacts K1 32 are closed when the telephone set is in the off-hook condition. The C.O. line circuit 10 is in the forward battery state, i.e., the tip is positive with respect to the ring. Direct current flows through the D.C. resistive network 34 comprised of R3 and causes a voltage drop to develop across R3. This voltage drop is directed to the input terminals of the op amp comparator 36 by the D.C. resistive voltage dividing network and appears as a negative input voltage, $V_i$, across these terminals. The magnitude of R3 is selected so that the input voltage signal will have a greater magnitude than the bias voltage, $V_b$.

In FIG. 4A the bias voltage $V_b$ is equal to $+V_R$ at time $t_1$ and $-V_R$ at time $t_2$. The output voltage is equal to logic 0 at time $t_1$ since the magnitude of $V_i$ is of greater magnitude and of opposite polarity from $V_b$. Thus, if the output state is sampled at time $t_1$ and is found to be logic 0, this indicates that $V_i$ is of opposite polarity from $V_b$ and that forward loop current is flowing through the D.C. resistive network 34 comprised of R3. At time $t_2$ the bias voltage is negative and the output is logic 0 even if no forward loop current is flowing. Thus, only at time $t_1$ and at other times when the voltage bias is positive may forward loop current be detected by the output voltage from the comparator.

Similarly, in FIG. 4B when reverse loop current is flowing through the D.C. resistive network the state of $V_O$, the comparator output signal, will be 1 at time $t_2$, thereby indicating that reverse loop current is flowing in the loop.

Accordingly, by switching the polarity of the bias voltage, sampling the output voltage to determine its state and comparing the output voltage state to the polarity of the bias voltage at the time of sampling the presence of forward and reverse loop current may be unambiguously detected.

The operation of the circuit to detect ringing by utilizing the single op amp comparator circuit will now be described with reference to FIG. 5. In FIG. 5 the comparator is biased positive by holding $V_C$ positive. The ringing signal is a 20 Hz. A.C. voltage applied across the tip and ring lines 12 and 14 of the C.O. line circuit 10. This ringing signal is A.C. coupled through capacitors $C_1$ and $C_2$ and appears across the A.C. resistive network 30 comprised of R1, R2, and R3. During the idle state, i.e., when the telephone set is in the on-hook condition, $V_C$ positive, and the relay contacts K1 32 are open, an A.C. voltage input signal is coupled to the terminals of the op amp comparator circuit 36 by the A.C. voltage dividing resistive network. The magnitude of the resistance in this network is selected so that the peaks of the A.C. voltage signal are of greater magnitude than the bias voltage. Accordingly, $V_O$ will appear as a series of negative pulses which may be detected to validate ringing.

In FIG. 6 an alternative embodiment of the invention is depicted which includes the capability of detecting forward and reverse battery state of the C.O. line circuit 10 while the telephone set is in the on-hook condition. When relay contact K1 32 is open, the differential voltage across the tip and ring lines 12 and 14 respectively is detected through the voltage dividing resistive network comprising R2, R3, R4, and R5 by the op amp comparator 36. R2 and R3 are selected to have high enough resistance so that virtually no loop current flows when the telephone set is in the on hook condition.

The following is a table of representative values and model identifications for the circuit elements depicted in FIG. 6:

$R_1 = 620 \Omega$ $R_2 = 2 M\Omega$ $R_3 = 2 M\Omega$ $R_4 = 82 k\Omega$ $R_5 = 80 k\Omega$ $R_6 = 3.5 M\Omega$ $C_1 = 0.47 \mu f$ The pulse recognition circuitry 26 in FIG. 1 includes a microprocessor programmed to control the value of $V_C$ according to whether the detection of the ringing signal or forward and reverse loop current is being implemented, for sampling the output signal from the comparator 22, for comparing the comparator output state to the bias voltage state, and for indicating the presence of a ringing signal or forward and reverse loop current. The implementation of the pulse recognition circuitry utilizes standard techniques well known in the art and is not part of the present invention.

Of substantial advantage to the invention is the fact that outgoing signalling from the telephone set is performed by the same relay contacts that configure the interface to receive incoming signalling. Outgoing signalling consists of transmitting loop closure, when the telephone set is off-hook, and dialing. Loop closure is transmitted when relay contact K2 32 is closed since a D.C. current path is then formed through $T_1$ and R3. Dialing is performed by opening and closing relay contact K2 32.

FIGS. 7A and 7B illustrate an important advantage of the present invention. In FIG. 7A a typical 8 channel circuit pack requiring 16 pulse-processor input ports to detect signalling from an interface utilizing two detectors per C.O. line appearance is illustrated. In FIG. 7B, a system utilizing the present system is illustrated. Only 8 input ports are required with an output strobe, for switching $V_C$, common to all 8 channels.

Alternative circuitry for accomplishing the functions of the circuits described with reference to FIGS. 2 and 6 may be utilized to implement the invention. For example, any comparator circuit that can operate with two or more different thresholds may be substituted for the comparator described above. Accordingly, the scope and breadth of the present invention is defined by the appended claims.

What is claimed is:

1. A method for determining the direction of loop current flow in a telephone loop circuit comprising the steps of:
   generating an input voltage with the polarity of said input voltage indicating the direction of said loop current;
   providing a bias voltage having a magnitude less than the magnitude of said input voltage;
   switching the polarity of said bias voltage according to a preselected time sequence;
   comparing said input voltage to said bias voltage to generate an output signal indicating whether said input voltage is of opposite polarity from said bias voltage;
   sampling said output signal at times $t_1$ and $t_2$ where the bias voltage is in a first polarity state at $t_1$ and a second polarity state at $t_2$; and
   comparing the sampled output signal to the first and second bias voltage polarity states to determine whether the input voltage is of opposite polarity from said first or said second bias voltage polarity state.

2. A tip-ring interface connecting a C.O. or PABX line circuit and a telephone set comprising:
   an A.C. resistive network for providing an A.C. input voltage state;
   a D.C. resistive network for providing a D.C. input voltage state;
   means for generating a bias voltage state of preselected magnitude, polarity, and duration;
   means for forming a sum of a selected one of said input voltage states and said bias voltage state;
   a comparator, adapted to receive said sum at its inputs, for producing an output signal that indicates whether said selected one of said input voltage states is of opposite polarity and greater magnitude than said bias voltage state; and
   means for switching the polarity of said bias voltage state according to a preselected time sequence.

3. The invention of claim 2 wherein said means for forming a sum further comprises:
   means for capacitively coupling said C.O. or PABX line circuit to said A.C. resistive network to detect forward or reverse loop current; and
   means for directly coupling said C.O. or PABX line to said detector to detect forward or reverse loop current;
   means for selectively switching between said capacitive and said direct coupling means.

4. The invention of claim 3 further comprising:
   pulse recognition means for sampling the output signal from said comparator to determine whether an A.C. ringing signal, forward loop current, or reverse loop current is present in said C.O. or PABX line circuits.

5. The invention of claim 4 wherein said pulse recognition means includes:
   means for providing said bias voltage state having a magnitude less than the magnitude of said input voltage state;
   means for switching the polarity of said bias voltage state according to a preselected time sequence;
   means for sampling the output signal of said comparator at times $t_1$ and $t_2$ where the bias voltage state is in a first polarity state at $t_1$ and a second polarity state at $t_2$; and
   means for referencing the sampled output signal to the first and second bias voltage polarity states to determine whether the input voltage state is of opposite polarity from said first or said second bias voltage state.

6. The invention of claim 5 wherein said selective switching means comprises:
   a relay contact activated to switch from said capacitive to said direct coupling means when the telephone set goes off-hook and from said direct to said capacitive coupling means when the telephone set goes on-hook.

7. The invention of claims 5 or 6, wherein said pulse recognition means comprises:
   a microprocessor for providing a strobe signal that controls the switching of said bias voltage state polarity and the duration of each bias voltage polarity state, for controlling the rate of sampling of said comparator output signal to determine whether an A.C. ringing signal, forward loop current, or reverse loop current is present in said C.O. or PABX line circuit.

8. An apparatus for determining the polarity of an externally supplied input voltage, $V_i$, comprising:
   means for providing a reference voltage $V_b$;
   means for selectively switching the polarity of $V_b$ between the values positive $V_R$ and negative $V_R$, where the absolute value of $V_R$ is less than the absolute value of $V_i$;
   means for algebraically adding $V_i$ to $V_b$ to form the algebraic sum of $V_i + V_b$;

a comparator, having inputs adapted to receive the sum of $V_i+V_b$, said comparator for producing an output signal, $V_O$, representing a logic 1 when the algebraic sum of $V_i+V_b$ is greater than 0 and for producing an output signal, $V_O$, representing a logic 0 when the algebraic sum of $V_i+V_b$ is less than 0;

means for sampling $V_O$ at times $t_1$ and $t_2$ where $V_b$ is equal to positive $V_R$ at $t_1$ and $V_b$ is equal to negative $V_R$ at $t_2$; and means for comparing the sampled value of $V_O$ to the polarity of $V_b$ to determine the polarity of $V_i$.

* * * * *